US012773669B2

(12) United States Patent
Lu et al.

(10) Patent No.: US 12,773,669 B2
(45) Date of Patent: Oct. 27, 2026

(54) DEVICE AND METHOD FOR ENHANCING LIQUID-LIQUID EMULSIFICATION

(71) Applicant: East China University of Science and Technology, Shanghai (CN)

(72) Inventors: Hao Lu, Shanghai (CN); Qiang Yang, Shanghai (CN); Yudong Li, Shanghai (CN); Yiqian Liu, Shanghai (CN); Pinyi Dai, Shanghai (CN); Shihan Wu, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 665 days.

(21) Appl. No.: 18/260,176

(22) PCT Filed: Mar. 25, 2021

(86) PCT No.: PCT/CN2021/082856
§ 371 (c)(1),
(2) Date: Jun. 30, 2023

(87) PCT Pub. No.: WO2022/147906
PCT Pub. Date: Jul. 14, 2022

(65) Prior Publication Data

US 2024/0058773 A1 Feb. 22, 2024

(30) Foreign Application Priority Data

Jan. 5, 2021 (CN) ........................ 202110006608.5

(51) Int. Cl.
*B01F 23/00* (2022.01)
*B01F 23/41* (2022.01)
(Continued)

(52) U.S. Cl.
CPC ...... *B01F 23/4105* (2022.01); *B01F 23/4143* (2022.01); *B01F 23/451* (2022.01);
(Continued)

(58) Field of Classification Search
CPC .................. B01F 25/211; B01F 23/451; B01F 2215/0431; B01F 2215/0427; B01F 2215/0422
See application file for complete search history.

(56) References Cited

U.S. PATENT DOCUMENTS

2011/0032789 A1 2/2011 Fukai
2017/0348036 A1 12/2017 Sasaki et al.
2019/0040820 A1* 2/2019 Taniel ................ F02M 25/0228

FOREIGN PATENT DOCUMENTS

CN 85205017 U 8/1986
CN 104437198 A 3/2015
(Continued)

*Primary Examiner* — Anshu Bhatia
(74) *Attorney, Agent, or Firm* — RABIN & BERDO, P.C.

(57) ABSTRACT

The invention provides a device for enhancing liquid-liquid emulsification. The device includes a jet part and a mixing part connected to the jet part. The jet part includes a feed tee for feeding major and dispersed phases, wherein the feed tee includes a first port, a second port, and a third port. The first port is used for feeding the major phase, and the second port is equipped with an ejector for feeding the dispersed phase. The ejector consists of an ejector housing and an ejector inlet section, as well as a spiral structure, a flow-guided structure, and an ejector pin structure that are connected sequentially. The mixing part includes a mixer comprising a cylindrical mixer shell, a mixer inlet section, a mixer outlet section, as well as a spiral section, a cavity section, and a variable diameter section for enhancing emulsion breakup and dispersion. A method for enhancing liquid-liquid emulsification is also disclosed. The emulsion produced by the device and method of the invention is uniformly dispersed, has long stability, and the device has a compact structure and low energy consumption. It is particularly suitable for liquid-liquid emulsification processes in fields such as chemical industry, food, coatings, and cosmetics.

9 Claims, 3 Drawing Sheets

(51) Int. Cl.

| | |
|---|---|
| ***B01F 23/451*** | (2022.01) |
| ***B01F 25/10*** | (2022.01) |
| ***B01F 25/20*** | (2022.01) |
| ***B01F 25/21*** | (2022.01) |
| ***B01F 25/4314*** | (2022.01) |
| ***B01F 25/433*** | (2022.01) |
| *B01F 25/00* | (2022.01) |

(52) U.S. Cl.

CPC .......... *B01F 25/103* (2022.01); *B01F 25/211* (2022.01); *B01F 25/28* (2022.01); *B01F 25/43141* (2022.01); *B01F 25/4334* (2022.01); *B01F 2025/916* (2022.01); *B01F 2215/0422* (2013.01); *B01F 2215/0427* (2013.01); *B01F 2215/0431* (2013.01)

(56) References Cited

FOREIGN PATENT DOCUMENTS

| | | | |
|---|---|---|---|
| CN | 207237745 | U | 4/2018 |
| CN | 210473637 | U | 5/2020 |
| CN | 111790281 | A | 10/2020 |

* cited by examiner

DEVICE AND METHOD FOR ENHANCING LIQUID-LIQUID EMULSIFICATION

TECHNICAL FIELD

The invention belongs to the field of liquid-liquid mixing for chemical, pharmaceutical and biological purposes, and specifically relates to a device and method for enhancing liquid-liquid emulsification.

BACKGROUND

Liquid-liquid emulsification is the process of dispersing and uniformly mixing two or more immiscible or partially miscible liquids to produce a stable emulsion, and is one of the important unit operations in the production of petroleum, chemical, pharmaceutical and food products. Traditional emulsification method typically involves thorough stirring of the major phase and dispersed phase in a mixing vessel. However, this method is time-consuming, has low dispersion and poor uniformity, and consumes significant energy.

In recent years, various new devices such as high-shear emulsifiers and static mixers have been applied to liquid-liquid emulsification. However, static mixers exhibit poor mixing performance, with large dispersed phase droplets and unstable emulsions. Dynamic high-shear mixers are difficult to use in high-temperature and high-pressure mixing conditions and consume a large amount of energy.

CN201921281523.2 discloses a hybrid emulsifying machine that uses a motor-driven stirring paddle to mix and emulsify the two phases. As the stirring paddle speed increases, the emulsification effect improves, but it also leads to increased energy consumption, especially for high-viscosity heterogeneous mixing. CN201721238474.5 discloses a composite tubular static mixer with winged structures installed at the front section to accelerate fluid disturbance between the major and dispersed phases. However, the mixing mechanism remains in a weak turbulent flow state, resulting in poor mixing performance and uneven distribution of the dispersed phase. CN201410748822.8 discloses an ultrasonic static mixer in which an ultrasonic generator is set outside the flow pipe, which can effectively avoid the problem of poor mixing effect due to short mixing length. However, the use of ultrasonic waves also increases energy consumption. Therefore, the development of micro mixers with excellent mixing performance holds practical significance.

INVENTION DESCRIPTION

To address the issues of insufficient emulsification and high energy consumption in traditional methods, the invention provides a device and method for enhancing liquid-liquid emulsification, using dispersion in the jet part and enhanced mixing in the mixing part to enhance the emulsification effect.

To achieve the above objectives, the invention employs the following technical solution:

A device for enhancing liquid-liquid emulsification comprises a jet part and a mixing part connected to the jet part. The jet part includes a feed tee for feeding major and dispersed phases, wherein the feed tee includes a first port, a second port, and a third port. The first port is used for feeding the major phase, and the second port is equipped with an ejector for feeding the dispersed phase. The ejector comprises a cylindrical ejector housing with an opening on one side and a hemispherical structure on the other side. The opening side of the ejector housing is an ejector inlet section. Inside the ejector housing, there is sequentially interconnected a spiral structure, a flow-guided structure and an ejector pin structure along the ejector inlet section in an inward direction. The hemispherical structure of the ejector housing is equipped with a jet orifice.

The mixing part includes a mixer comprising a cylindrical mixer shell, a mixer inlet section and a mixer outlet section at both ends of the mixer shell, as well as a spiral section, a cavity section and a variable diameter section for enhancing emulsion breakup and dispersion. The mixer inlet section is flange-connected to the third port.

According to a preferred embodiment of the invention, the diameter of the ejector inlet section is D1. The ejector inlet section has internal or external threads for connection with a dispersed phase pipeline. The spiral structure comprises a cylindrical support rod at the axis and a first spiral blade connected to the inner wall of the ejector housing and the support rod, which is used to generate swirling flow of the dispersed phase to increase turbulent kinetic energy. The flow-guided structure includes a cylindrical deflection segment and a tapered deflection segment with a gradually reducing diameter, where the diameter of the cylindrical deflection segment is ½ to ¾ times of the ejector inlet section diameter D1, and the bottom angle $\alpha$ of the tapered deflection segment is 30° to 50°. The ejector pin structure is cylindrical. The diameter of the jet orifice is 0.2 to 12 mm. The diameter of the ejector pin structure is ⅘ to ⁶⁄₅ times of the diameter of the jet orifice, and the distance between the ejector pin structure and the jet orifice is 1 to 5 mm.

According to a preferred embodiment of the invention, the spiral section, the cavity section and the variable diameter section inside the mixer are sequentially connected between the mixer inlet section and the mixer outlet section, forming a repetitive structure. The number of repetitions n of the spiral section, the cavity section, and the variable diameter section is defined as mixed series, where n≥1.

According to a preferred embodiment of the invention, the overall length of the mixer is L, the length of the spiral section is ⅛n to ½*n* times of the mixer length L, and the length of the variable diameter section is ⅛n to ½*n* times of the mixer length L.

According to a preferred embodiment of the invention, a cylindrical support structure is provided at the axis within the mixer. The spiral section includes a second spiral blade connected to the inner wall of the mixer shell and the support structure, generating a rotating turbulent flow field to enhance collision and dispersion between emulsions. The cavity section is a cylindrical cavity structure. The variable diameter section has an inwardly tapered structure with a taper angle R of 5° to 10°, which enhances emulsion breakup and dispersion and further strengthens the degree of emulsification.

According to a preferred embodiment of the invention, the diameter of the mixer inlet section is d1. The spiral section includes a third spiral blade connected to the inner wall of the mixer shell, generating a rotating turbulent flow field to enhance collision and dispersion between emulsions. The cavity section is an inwardly expanding double-lobe structure, creating vortex impact and homogenizing the particle size and droplets of the dispersed phase. The height of the cavity section is 1.2 to 1.4 times of the diameter of the mixer inlet section d1, and the ratio of height to length of the cavity section is 0.8 to 1.2. The variable diameter section has an inwardly expanding structure with a taper angle $\alpha$ of 5° to 10°, further homogenizing the distribution of the dispersed phase.

The method for intensifying liquid-liquid emulsification using the aforementioned device involves the following steps:

(1) The major phase for liquid-liquid emulsification enters the first port of the jet part; the dispersed phase enters the ejector inlet section.

(2) The dispersed phase entering the ejector generates a swirling flow through the spiral structure, guided along the flow-guided structure, then sheared and broken between the ejector pin structure and the ejector housing and ejected from the jet orifice to dispersed in the major phase, forming a preliminary emulsion.

(3) The preliminary emulsion enters the mixing part and passes through the spiral section, the cavity section, and the variable diameter section in sequence, generating rotating turbulence and turbulent breakup to further enhance emulsion breakup and dispersion, forming a stable emulsion.

According to a preferred embodiment of the invention, the dispersed phase is dispersed into droplets with a particle size of 30 to 200 μm after passing through the ejector; and the dispersed phase is dispersed into droplets with a particle size of 5 to 50 μm after passing through the mixing part.

According to a preferred embodiment of the invention, the mode of contact between the dispersed phase and the major phase in the jet part is cocurrent, counter-current or convection type.

According to a preferred embodiment of the invention, the flow rate ratio of the dispersed phase to the major phase is 0 to 0.8. Depending on the specific processing requirements, the jet part is equipped with a single ejector or several ejectors in parallel to adjust the flow rate ratio of the dispersed phase to the major phase.

The beneficial effects of the invention are as follows:

The invention provides a device and method for enhancing liquid-liquid emulsification. The dispersed phase is compressed and sheared by the ejector in the jet part to produce turbulent kinetic energy, which is ejected from the ejector and dispersed uniformly in the major phase to achieve the initial mixing and emulsification of the emulsified major phase and the disperse phase. The mixing of the initially emulsified emulsion is intensified by the mixer in the mixing part. The degree of emulsification is further enhanced by the rotating turbulent flow field generated by the spiral section, which enhances the collision and dispersion between the emulsions, and by the variable diameter section, which enhances the breakup and dispersion of the emulsions. The emulsion produced by the device and method is uniformly dispersed, has long stability, and the device has a compact structure and low energy consumption. It is particularly suitable for liquid-liquid emulsification processes in fields such as chemical industry, food, coatings, and cosmetics.

DETAILED DESCRIPTION

The following is a further detailed description of the present invention, combined with embodiments. Obviously, the following embodiments are provided for further clarification of the invention and should not be construed as limiting the scope of protection of the invention. Non-essential modifications and adjustments made by professional technical personnel in the art based on the content of the invention are still within the scope of protection of the invention.

Embodiment 1

Figure 1:
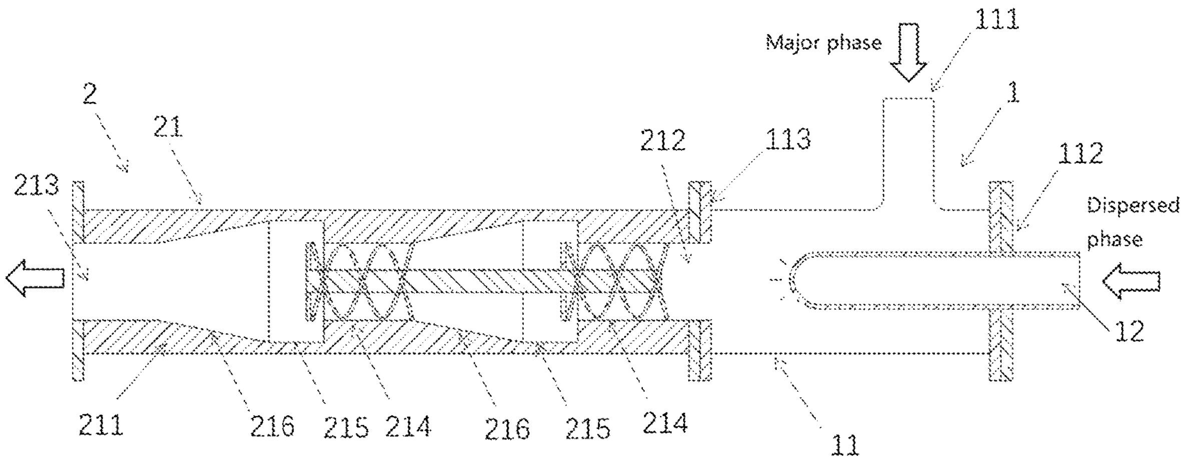
FIG. 1 is a schematic diagram of the device for enhancing liquid-liquid emulsification.

Referring to FIG. 1, the invention relates to a device for enhancing liquid-liquid emulsification. The device comprises a jet part 1 and a mixing part 2 connected to the jet part 1. The jet part 1 includes a feed tee 11 for feeding major and dispersed phases, wherein the feed tee 11 includes a first port 111, a second port 112, and a third port 113. The first port 111 is used for feeding the major phase for emulsification, and the second port 112 is equipped with an ejector 12 for compressing and shearing the dispersed phase to generate turbulent energy. The dispersed phase is ejected from the ejector 12 into the feed tee 11 and dispersed uniformly in the major phase to achieve the initial emulsification of the major phase and the disperse phase.

The major phase and dispersed phase enter the mixing part 2 through the third port 113 after initial emulsification. The mixing part 2 includes a mixer 21 comprising a cylindrical mixer shell 211, a mixer inlet section 212 and a mixer outlet section 213 at both ends of the mixer shell 211, as well as a spiral section 214, a cavity section 215 and a variable diameter section 216 for enhancing emulsion breakup and dispersion. The mixer inlet section 212 is flange-connected to the third port 113.

Figure 2:
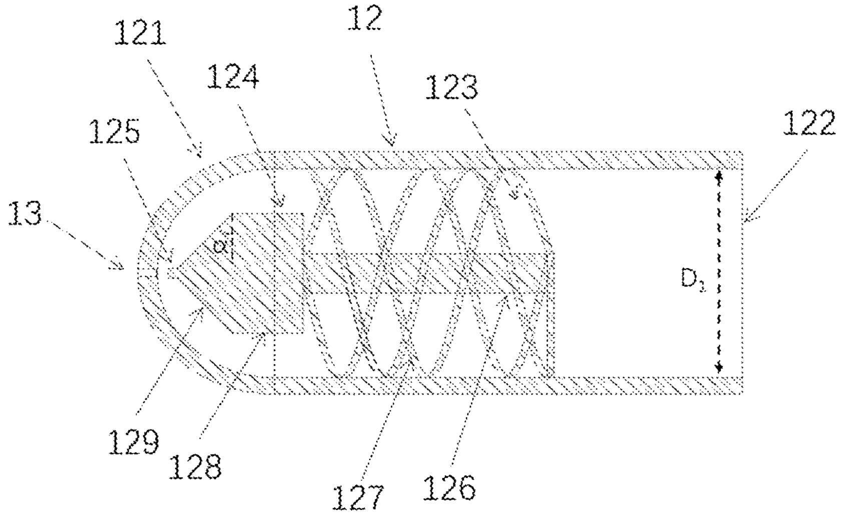
FIG. 2 is a schematic diagram of the ejector.

Furthermore, referring to FIG. 2, the ejector 12 comprises a cylindrical ejector housing 121 with an opening on one side and a hemispherical structure on the other side. The opening side of the ejector housing 121 is defined as an ejector inlet section 122 of the ejector 12. The ejector inlet section 122 has internal or external threads (not shown in the figure) for connection with a dispersed phase pipeline. The diameter of the ejector inlet section 122 is D1. Inside the ejector 12, there is a spiral structure 123, a flow-guided structure 124 and an ejector pin structure 125 sequentially connected along the ejector inlet section 122 in an inward direction. The spiral structure 123 comprises a cylindrical support rod 126 at the axis of the ejector 12 and a first spiral blade 127 connected to the inner wall of the ejector housing 121 and the support rod 126, which is used to generate swirling flow of the dispersed phase to increase turbulent kinetic energy. The flow-guided structure 124 includes a cylindrical deflection segment 128 and a tapered deflection segment 129 with a gradually reducing diameter, where the diameter of the cylindrical deflection segment 128 is ½ to ¾ times of the ejector inlet section 122 diameter D1, and the bottom angle $\alpha$ of the tapered deflection segment 129 is 30° to 50°. The ejector pin structure 125 is cylindrical. The side of the hemispherical structure of the ejector housing 121 is equipped with a jet orifice 13, and the diameter of the jet orifice 13 is 0.2-12 mm. The diameter of the ejector pin structure 125 is ⅘ to ⁶⁄₅ times of the diameter of the jet orifice 13, and the distance between the ejector pin structure 125 and the jet orifice 13 is 1 to 5 mm.

Furthermore, the spiral section 214, the cavity section 215 and the variable diameter section 216 inside the mixer 21 are sequentially connected between the mixer inlet section 212 and the mixer outlet section 213, forming a repetitive structure. The number of repetitions n of the spiral section 214, the cavity section 215, and the variable diameter section 216 is defined as mixed series, where $n \geq 1$.

Furthermore, the mixer 21 in the mixing part 2 is divided into a first mixer 22 and a second mixer 23 based on the different structures of the spiral section 214, the cavity section 215, and the variable diameter section 216 for enhancing emulsion breakup and dispersion.

Figure 3:
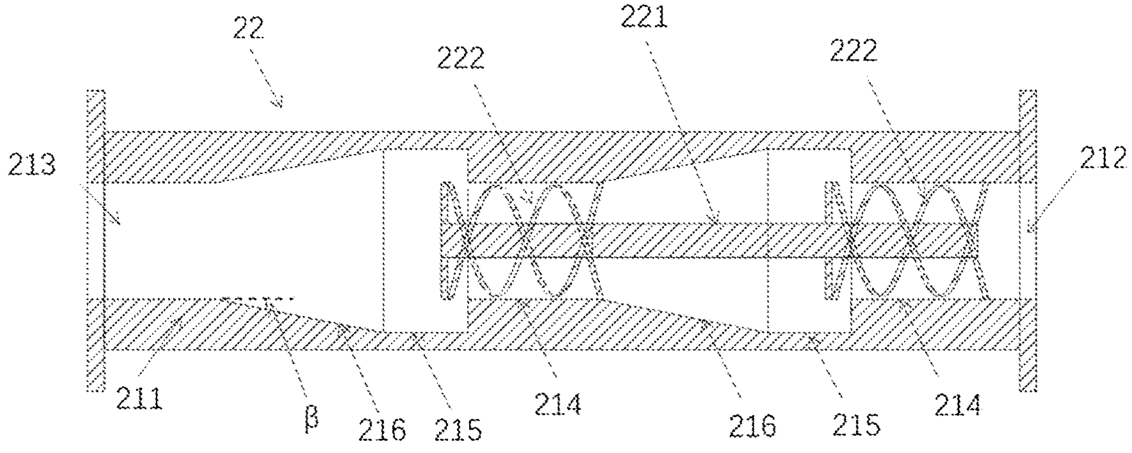
FIG. 3 is a schematic diagram of the first mixer.

When the mixer in the mixing part 2 is set to the first mixer 22, referring to FIG. 3, a cylindrical support structure 221 is provided at the axis within the first mixer 22. The spiral section 214 includes a second spiral blade 222 connected to the inner wall of the mixer shell 211 and the support structure 221, generating a rotating turbulent flow field to enhance collision and dispersion between emulsions. The cavity section 215 is a cylindrical cavity structure. The variable diameter section 216 has an inwardly tapered structure with a taper angle $\theta$ of 5° to 10°, which enhances emulsion breakup and dispersion and further strengthens the degree of emulsification.

Figure 4:
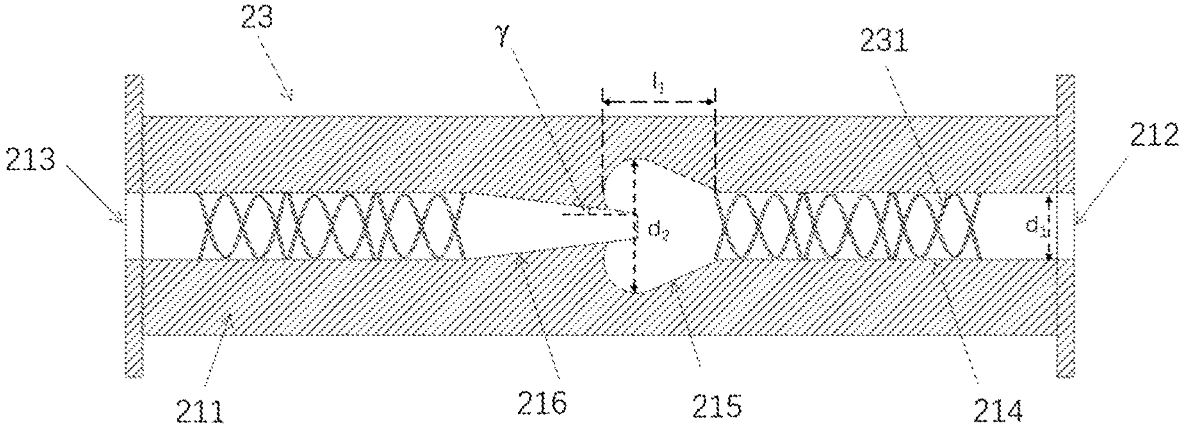
FIG. 4 is a schematic diagram of the second mixer.

When the mixer in the mixing part 2 is set to the second mixer 23, referring to FIG. 4, the diameter of the mixer inlet section 212 is d1. The spiral section 214 includes a third spiral blade 231 connected to the inner wall of the mixer shell 211, generating a rotating turbulent flow field to enhance collision and dispersion between emulsions. The cavity section 215 is an inwardly expanding double-lobe structure, creating vortex impact and homogenizing the particle size and droplets of the dispersed phase. The height of the cavity section 215 d2 is 1.2 to 1.4 times of the diameter of the mixer inlet section 212 d1, and the ratio of height to length of the cavity section 215 d2/l1 is 0.8 to 1.2. The variable diameter section 216 has an inwardly expanding structure with a taper angle $\alpha$ of 5° to 10°, further homogenizing the distribution of the dispersed phase and producing a well-dispersed and stable emulsion over a long period.

Furthermore, the overall length of the mixer 21 is L, the length of the spiral section 214 is $\frac{1}{8}n$ to $\frac{1}{2}n$ times of the length of the mixer L, and the length of the variable diameter section 216 is $\frac{1}{8}n$ to $\frac{1}{2}n$ times of the length of the mixer L.

The method for enhancing liquid-liquid emulsification using the above-mentioned device involves the following steps:

(1) The major phase used for liquid-liquid emulsification is pumped into the first port 111 of the jet part 1 and the flow rate of the major phase is measured using a rotameter. The dispersed phase is pumped into the ejector inlet section 122 of the ejector 12 using a metering pump, and the flow rate of the dispersed phase is measured using a float flowmeter.

(2) The dispersed phase entering the ejector 12 generates a swirling flow through the spiral structure 123, guided along the flow-guided structure 124, then sheared and broken between the ejector pin structure 125 and the ejector housing 121 and ejected from the jet orifice 13 to dispersed in the major phase, forming a preliminary emulsion.

(3) The preliminary emulsion enters the mixing part 2 and passes through the spiral section 214, the cavity section 215, and the variable diameter section 216, generating rotating turbulence and turbulent breakup to further enhance emulsion breakup and dispersion, forming a stable emulsion.

Furthermore, the dispersed phase is dispersed into droplets with a particle size of 30 to 200 μm after passing through the ejector 12; and the dispersed phase is dispersed into droplets with a particle size of 5 to 50 μm after passing through the mixing part 2.

Figure 5:
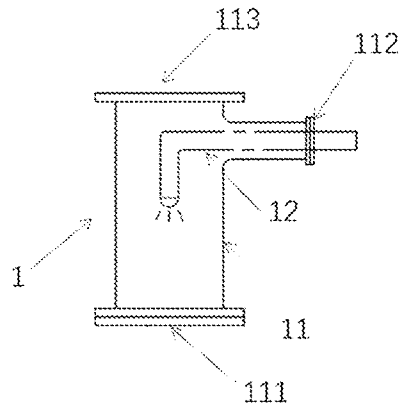
FIG. 5 is a schematic diagram of the contact mode of the jet part as a counter-flow type.
Figure 6:
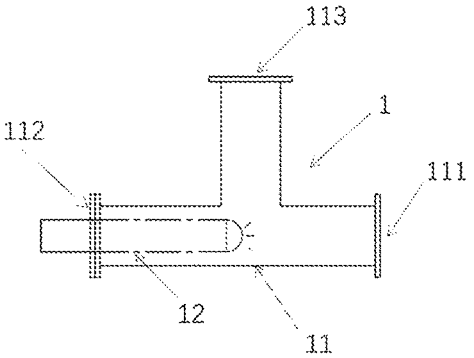
FIG. 6 is a schematic diagram of the contact mode of the jet part as a convection type.

Furthermore, referring to FIGS. 1, 5, and 6, the mode of contact between the dispersed phase and the major phase in the jet part is cocurrent (FIG. 1), counter-current (FIG. 5) or convection type (FIG. 6). In the cocurrent type, the flow direction of the major phase and the injection direction of the dispersion phase are the same. In the counter-current type, the flow direction of the major phase is opposite to the injection direction of the dispersion phase. In the convection type, the flow direction of the major phase and the injection direction of the dispersion phase are convective.

Figure 7:
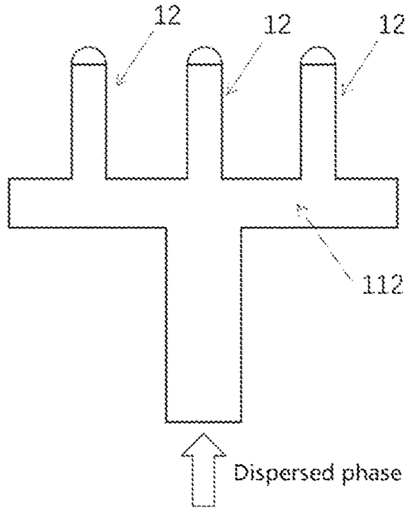
FIG. 7 is a schematic diagram of the ejectors in parallel.

Furthermore, the flow rate ratio of the dispersed phase to the major phase is 0 to 0.8. Depending on the specific processing requirements, referring to FIGS. 1 and 7, the jet part is equipped with a single ejector 12 or several ejectors 12 in parallel to adjust the flow rate ratio of the dispersed phase to the major phase.

Embodiment 2

The device and method described in Embodiment 1 are used for liquid-liquid emulsification of water as the major phase and diesel as the dispersion phase. The flow rate of the major phase is 500 L/h, and the flow rate of the dispersion phase is 30 L/h. The emulsification effect is compared with a conventional static mixer and a high shear mixer.

The mode of contact in the jet part is the cocurrent type, with a single ejector. The structural dimensions of the ejector are as follows: the diameter of the ejector inlet section is 12 mm; the length of the spiral structure is 10 mm; the diameter of the cylindrical deflection segment in the flow-guided structure is 8 mm and the bottom angle of the tapered deflection segment is 30°. The diameter of the ejector pin structure is 1 mm, the diameter of the jet orifice is 1 mm, and the distance between the ejector pin structure and the jet orifice is 1 mm. The mixing section is set to the first mixer, with the following structural dimensions: the number of the mixed series n is 2, the diameter of the mixer inlet section is 8 mm, the overall length of the mixer is 60 mm and the variable diameter section has a taper angle of 5°.

The liquid-liquid emulsification is carried out by the device described in Embodiment 1, a static mixer SH, a static mixer SV and a high shear mixer with a rotational speed of 1500 r/min. After stable operation for a certain period, samples of the emulsion are taken for evaluation using turbidity sedimentation and particle size analysis.

The turbidity (in NTU) sedimentation comparison of emulsion samples taken from each device is shown in the following table.

| | Time/min | | | | | | |
|---|---|---|---|---|---|---|---|
| Type of mixer | 0 | 10 | 20 | 30 | 40 | 50 | 60 |
| Static mixer SH | 268 | 115 | 79.5 | 66.5 | 30.4 | 14.8 | 9.64 |
| Static mixer SV | 185 | 383 | 21.7 | 14.7 | 12.2 | 10.7 | 9.34 |
| High shear mixer | 957 | 469 | 269 | 167 | 122 | 88.4 | 48.2 |
| Device in Embodiment 1 | 1980 | 1562 | 1153 | 807 | 659 | 503 | 407 |

After stable operation of the devices for 5 minutes, the comparison of the average particle size (in μm) of the dispersed phase in the emulsion samples taken from each device is shown in the following table.

| Type of mixer | Average particle size (μm) |
|---|---|
| Static mixer SH | 48 |
| Static mixer SV | 32 |
| High shear mixer | 33 |
| Device in Embodiment 1 | 22 |

From the perspective of turbidity sedimentation and average particle size, the device and method described in Embodiment 1 show significantly higher turbidity and noticeably smaller average particle size compared to other devices. The emulsification effect is significantly superior to conventional static mixer SH, static mixer SV, and high shear emulsifier.

Embodiment 3

The device and method described in Embodiment 1 are used for liquid-liquid emulsification of water as the major phase and diesel as the dispersion phase, under the same conditions as Embodiment 2. The flow rate of the major phase is 400 L/h, and the flow rate of the dispersed phase is 24 L/h. After the device operating stably for a certain period, emulsion samples are taken, and the emulsification effect is evaluated based on turbidity sedimentation. The results are shown in the following table. As the flow rate of the major phase decreases from 500 L/h to 400 L/h, there is a slight decrease in turbidity, but the emulsification effect remains favorable.

| Flow rate | Time (min) | | | | | | |
|---|---|---|---|---|---|---|---|
| of the major phase | 0 | 10 | 20 | 30 | 40 | 50 | 60 |
| 500 L/h | 1980 | 1562 | 1153 | 807 | 659 | 503 | 407 |
| 400 L/h | 1800 | 1500 | 1090 | 768 | 623 | 483 | 367 |

Embodiment 4

In a certain oilfield, the crude oil extracted contains a high concentration of hydrogen sulfide, which causes strong corrosion to the pipelines and equipments used for transportation. Therefore, a desulfurizing agent is required to remove the hydrogen sulfide from the crude oil. However, due to the uneven mixing of the desulfurizing agent and the hydrogen sulfide in the crude oil, it is common to introduce an excessive amount of desulfurizing agent to react with the hydrogen sulfide in order to ensure that the hydrogen sulfide content is removed to below 15 mg/kg, resulting in a significant presence of desulfurizing agent molecules in the crude oil. Additionally, the presence of the desulfurizing agent enhances oil-water emulsification effect, which is unfavorable for downstream oil-water separation. Therefore, the device described in Embodiment 1 is incorporated into the existing process, in which multiple ejectors are connected in parallel, the length of the mixer is 2 m, and the number of mixed series is 2, to enhance the mixing of the desulfurizing agent and crude oil. Before the modification, the hydrogen sulfide content was 20 mg/kg, and the desulfurizing agent-to-crude oil ratio was 2%. After the modification, the hydrogen sulfide content decreased to 15 mg/kg, and the desulfurizing agent-to-crude oil ratio decreased to 1%. The modification effectively enhanced the liquid-liquid mixing emulsification of the crude oil and desulfurizing agent, meeting the desulfurization requirements with the reduced amount of desulfurizing agent.

The invention claimed is:

1. A device for enhancing liquid-liquid emulsification, comprising:

a jet part and a mixing part connected to the jet part, wherein the jet part includes a feed tee which includes a first port, a second port, and a third port for feeding major and dispersed phases, wherein the first port is used for feeding the major phase, and the second port is equipped with an ejector for feeding the dispersed phase; wherein the ejector comprises a cylindrical ejector housing with an opening on one side and a hemispherical structure on the other side, wherein the opening side of the ejector housing is defined as an ejector inlet section; a spiral structure, a flow-guided structure and an ejector pin structure are connected sequentially along the ejector inlet section inwardly inside the ejector; and the hemispherical structure of the ejector housing is equipped with a jet orifice; and the mixing part includes a mixer comprising a cylindrical mixer shell, a mixer inlet section and a mixer outlet section at both ends of the mixer shell, as well as a spiral section, a cavity section and a variable diameter section for enhancing emulsion breakup and dispersion, wherein the mixer inlet section is flange-connected to the third port, wherein the diameter of the ejector inlet section is D1;

the ejector inlet section has internal or external threads for connection with a dispersed phase pipeline;

the spiral structure comprises a cylindrical support rod at the axis and a first spiral blade connected to the inner wall of the ejector housing and the support rod, which is used to generate swirling flow of the dispersed phase to increase turbulent kinetic energy;

the flow-guided structure includes a cylindrical deflection segment and a tapered deflection segment with a gradually reducing diameter, wherein the diameter of the cylindrical deflection segment is ½ to ¾ times of the ejector inlet section diameter D1, and the bottom angle $\alpha$ of the tapered deflection segment is 30° to 50°;

the ejector pin structure is cylindrical;

the diameter of the jet orifice is 0.2 to 12 mm;

the diameter of the ejector pin structure is ⅘ to ⁶⁄₅ times of the diameter of the jet orifice; and the distance between the ejector pin structure and the jet orifice is 1 to 5 mm.

2. The device for enhancing liquid-liquid emulsification in claim 1, wherein the spiral section, the cavity section and the variable diameter section inside the mixer are sequentially connected between the mixer inlet section and the mixer outlet section, and form a repetitive structure, wherein the number of repetitions n of the spiral section, the cavity section, and the variable diameter section is defined as mixed series, where n≥1.

3. The device for enhancing liquid-liquid emulsification in claim 2, wherein the overall length of the mixer is L, the length of the spiral section is ⅛n to ½n times of the mixer length L, and the length of the variable diameter section is ⅛n to ½n times of the mixer length L.

4. The device for enhancing liquid-liquid emulsification in claim 2, wherein a cylindrical support structure is provided at the axis within the mixer;

the spiral section includes a second spiral blade connected to the inner wall of the mixer shell and the support structure, generating a rotating turbulent flow field to enhance collision and dispersion between emulsions;

the cavity section is a cylindrical cavity structure; and the variable diameter section has an inwardly tapered structure with a taper angle β of 5° to 10°, which enhances emulsion breakup and dispersion and further strengthens the degree of emulsification.

5. The device for enhancing liquid-liquid emulsification in claim 2, wherein the diameter of the mixer inlet section is d1;

the spiral section includes a third spiral blade connected to the inner wall of the mixer shell, generating a rotating turbulent flow field to enhance collision and dispersion between emulsions;

the cavity section is an inwardly expanding double-lobe structure, creating vortex impact and homogenizing the particle size and droplets of the dispersed phase, wherein the height of the cavity section is 1.2 to 1.4 times of the diameter of the mixer inlet section d1, and the ratio of height to length of the cavity section is 0.8 to 1.2;

the variable diameter section has an inwardly expanding structure with a taper angle γ of 5° to 10°, further homogenizing the distribution of the dispersed phase.

6. A method for enhancing liquid-liquid emulsification using the device in claim 1, comprising the following steps:

(1) the major phase for liquid-liquid emulsification entering the first port of the jet part; and the dispersed phase entering the ejector inlet section of the ejector;

(2) the dispersed phase generating a swirling flow through the spiral structure, guided along the flow-guided structure, then sheared and broken between the ejector pin structure and the ejector housing and ejected from the jet orifice to dispersed in the major phase, forming a preliminary emulsion;

(3) the preliminary emulsion entering the mixing part and passing through the spiral section, the cavity section, and the variable diameter section, generating rotating turbulence and turbulent breakup to further enhance emulsion breakup and dispersion, forming a stable emulsion.

7. The method for enhancing liquid-liquid emulsification in claim 6, wherein the dispersed phase is dispersed into droplets with a particle size of 30 to 200 μm after passing through the ejector; and the dispersed phase is dispersed into droplets with a particle size of 5 to 50 μm after passing through the mixing part.

8. The method for enhancing liquid-liquid emulsification in claim 6, wherein the mode of contact between the dispersed phase and the major phase in the jet part is concurrent, counter-current or convection type.

9. The method for enhancing liquid-liquid emulsification in claim 6, wherein the flow rate ratio of the dispersed phase to the major phase is equal to or lower than 0.8; and the jet part is equipped with a single ejector or several ejectors in parallel to adjust the flow rate ratio of the dispersed phase to the major phase depending on the specific processing requirements.

* * * * *